United States Patent [19]

Rogers

[11] Patent Number: 4,603,805
[45] Date of Patent: Aug. 5, 1986

[54] METHOD FOR ENHANCING THE SOLDERABILITY OF NICKEL LAYERS

[75] Inventor: William O. Rogers, Tempe, Ariz.

[73] Assignee: Motorola, Inc., Schaumburg, Ill.

[21] Appl. No.: 736,156

[22] Filed: May 20, 1985

[51] Int. Cl.$^4$ ............................................... B23K 1/20
[52] U.S. Cl. ..................................... 228/123; 228/124; 228/209; 148/6.3; 427/92; 427/377
[58] Field of Search ............... 228/123, 124, 208, 209; 148/6.3; 427/92, 98, 377

[56] References Cited

U.S. PATENT DOCUMENTS

| | | | |
|---|---|---|---|
| 1,863,342 | 6/1932 | Kelly | 148/6.3 X |
| 2,793,420 | 5/1957 | Johnston et al. | 228/209 X |
| 3,065,537 | 11/1962 | Patriarca et al. | 228/209 |
| 3,418,174 | 12/1968 | Carter | 148/6.3 X |
| 3,736,167 | 5/1973 | Bachman et al. | 427/98 |
| 4,024,631 | 5/1977 | Castillero | 427/98 X |

FOREIGN PATENT DOCUMENTS 1331980 9/1973 United Kingdom ................ 228/123

Primary Examiner—Kenneth J. Ramsey
Attorney, Agent, or Firm—Robert M. Handy

[57] ABSTRACT

Nickel layers used in electronic devices are frequently plated in solutions containing phosphorus. Residual phosphorus trapped in the plated nickel layer reduces solderability with respect to Pb-Sn solders. Voids are frequently found in the soldered joints. Solderability of such phosphorus containing nickel layers is enhanced and the number of voids is much reduced by heating the nickel surface first in an oxidizing atmosphere and then in a reducing atmosphere prior to soldering. The oxidation temperature should exceed 347° C. in order to oxidize the residual phosphorus and drive off the volatile phosphorus oxides. Hydrocarbons and volatile sulfides are also removed. The reducing step removes the non-volatile nickel oxides, leaving a clean surface for soldering which is substantially free of nickel oxide, phosphorus and phosphorus oxides, sulfides, and organics.

10 Claims, 4 Drawing Figures

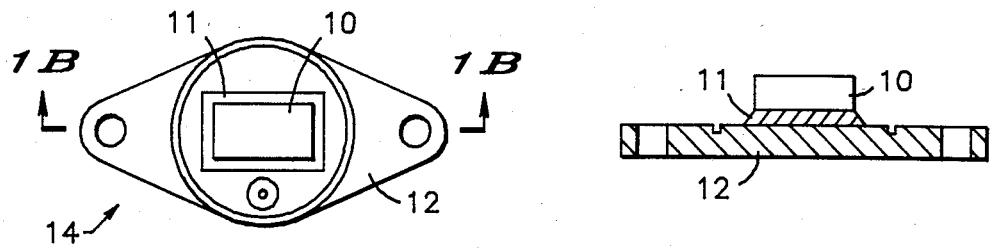
*FIG. 1A*
*FIG. 1B*
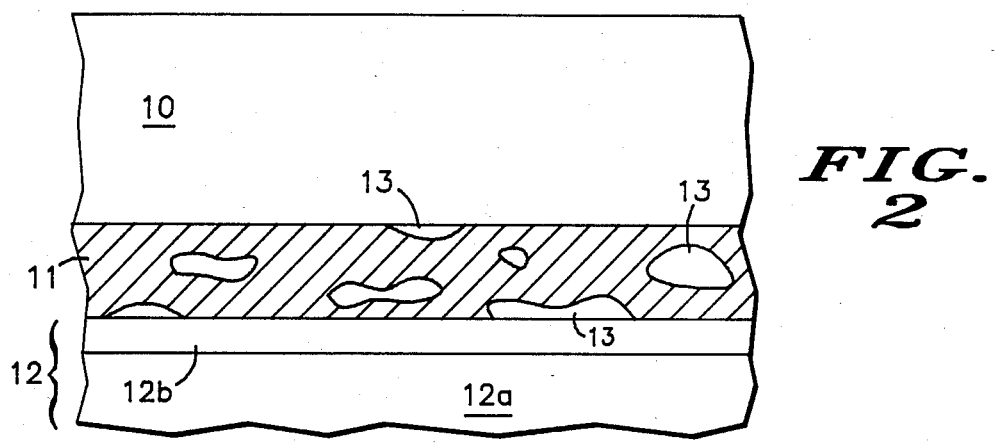
*FIG. 2*
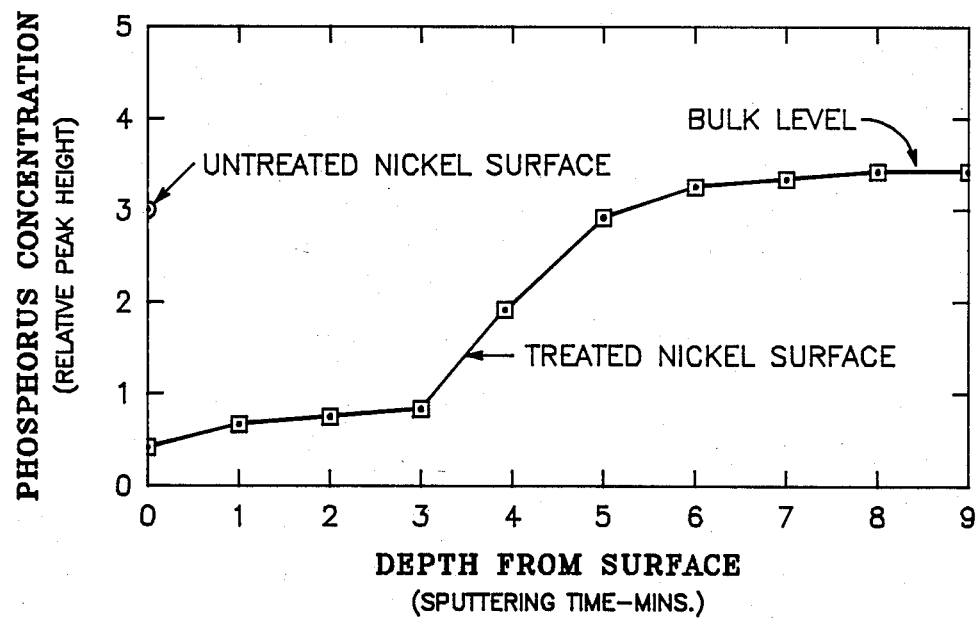
*FIG. 3*

METHOD FOR ENHANCING THE SOLDERABILITY OF NICKEL LAYERS

FIELD OF THE INVENTION

This invention relates to a method for enhancing the solderability of nickel surfaces which contain phosphorus and other contaminants and in particular, electroless plated nickel layers used in connection with semiconductor devices.

BACKGROUND ART

The use of nickel coated heat sinks is common in connection with semiconductor devices. The heat sink is usually of copper or other metal. Frequently, the semiconductor die are attached to the coated heat sinks by soldering. A nickel coating may be applied to the heat sinks by a variety of techniques. Electroless plating is a common method. Electroless nickel layers often contain up to fifteen percent phosphours.

A difficulty which is frequently encountered in soldering semiconductor die to nickel plated heat sinks is the occurrence of voids in the solder. These voids are apparently the result of outgassing which occurs during the soldering process. A further difficulty often encountered in connection with nickel layers is incomplete wetting of the nickel surface by the solder. These problems tend to be more severe with electroless plated nickel layers, particularly those which are high in phosphorus. Thus, a need continues to exist for improved techniques for soldering semiconductor die or other electronic elements to nickel plated or surfaced heat sinks.

Accordingly, it is an object of the present invention to provide an improved process for promoting the solderability of objects coated with nickel.

It is a further object of the present invention to provide an improved process for promoting the solderability of objects coated with nickel which contains phosphorus.

It is an additional object of the present invention to provide a process for improving the solderability of objects coated with electroless nickel plating.

It is a further object of the present invention to provide an improved process for soldering semiconductor die to metal headers having a nickel surface.

It is a further object of the present invention to provide an improved process for reducing void formation in solder joints to phosphorus containing nickel layers or surfaces.

SUMMARY OF THE INVENTION

A method is provided for improving the solderability to phosphorus containing nickel surfaces, comprising, providing a nickel surface containing phosphorus, then heating the nickel surface in an oxidizing atmosphere to a temperature of at least 347° C., and then heating the nickel surface in a reducing atmosphere. The solder is placed in contact with the reduced nickel surface and the two are heated to form the joint. It is essential that the oxidation step be carried out above 347° C. and preferable that it be carried out at a temperature in the range 400°–600° C. for a time in the range 2–15 minutes in dry air. It is preferable that the reduction step be carried out at a temperature at the range 300°–500° C. for a time in the range 2–15 minutes in dry hydrogen.

BRIEF DESCRIPTION OF THE DRAWINGS

FIGS. 1A–B show, respectively, a top view and cross-sectional view of a typical power semiconductor die mounted on a nickel plated copper header.

FIG. 2 is a cross-section of a portion of the device of FIG. 1B greatly enlarged.

FIG. 3 shows profiles of phosphorus concentration as a function of depth into electroless plated nickel layers.

DETAILED DESCRIPTION OF THE DRAWINGS

Electroless nickel plated copper heat sinks, such as for a button rectifier or a type TO-3 device, are commonly used in assembling semiconductor devices. Lead-tin solders having a composition in the range 90% Pb and 10% Sn to 100% Pb are frequently used as a soldering material, with 95% Pb, 5% Sn being typical. Solders such as 92.5% Pb, 5% In, 2.5% Ag are also common. Other solder materials can also be used.

FIGS. 1A–B shows semiconductor die 10 mounted by solder means 11 to heat sink or header 12 to form a TO-3 type semiconductor device 14. The cap and leads have been omitted in FIGS. 1A–B so that the internal construction details may be seen. FIG. 1B shows a cross-section of the device of FIG. 1A.

FIG. 2 shows, greatly enlarged, a cross-section of a portion of the device of FIG. 1B illustrating the presence of voids 13 in solder region 11 between semiconductor die 10 and nickel plated header 12. Header 12 is shown as consisting of copper base 12a covered by nickel coating 12b. For clarity, solder region 11 is shown hatched in FIGS. 1B and 2.

The degree of wetting between a liquid and a solid surface can be determined approximately by measuring the contact angle between the liquid and the solid. Procedures for making such measurements are well known in the art. Solder wetting studies were made in which the contact angle against pure nickel surfaces and electroless nickel surfaces were compared. It was found that the electroless nickel surface has a greater contact angle and thus less tendency for the solder to wet the surface than with the pure nickel. It was also observed that voids are often found in the solder layers between semiconductor die and electroless nickel plated surfaces. The voids were present even though the surfaces were chemically cleaned prior to the soldering operations and/or the soldering operations were carried out in a protective or a reducing atmosphere.

It was discovered that the comparatively poor contact angle and the higher void concentrations found in solders on electroless nickel surfaces are due primarily to the presence of residual phosphorus in the electroless nickel layers. Other impurities such as sulfur and hydrocarbons may also contribute. Many chemical solutions used for the plating of nickel contain a significant percentage of phosphorus. This is particularly true of solutions used for electroless nickel plating. It is known in the art that electroless nickel films can contain up to 15% phosphorus, depending upon the pH of the plating solution and the plating conditions. Electroless nickel layers may also contain sulfur compounds and hydrocarbons depending on the age and condition of the plating solution.

It is known that the presence of the oxides, phosphorus or phosphorus compounds, sulfur compounds, and hydrocarbons decrease the solderability of nickel surfaces. In conventional soldering operations, fluxes are used in order to overcome the deleterious effects of these surface contaminants. However, when semiconductor devices are to be attached to headers, fluxes are generally to be avoided because of the potential they have for contamination of the semiconductor die. Reducing atmospheres are also commonly used during soldering of semiconductor die but these do not remove impurities such as phosphorus.

It has been found that solder wetting could be substantially improved and the number of voids in the solder region substantially reduced by pretreating the nickel surfaced heat sinks or headers prior to the soldering operation. This pretreatment substantially lowers the residual phosphorus concentration in the surface of the nickel coating and is believed to similarly remove or decrease residual sulfur compounds and organics.

FIG. 3 shows the phosphorus concentration profile as a function of depth from the surface of an untreated electroless plated nickel layer and a similar electroless plated nickel layer subjected to the pretreatment process of the present invention. This data was obtained by measuring the Auger emission spectra as the nickel surface was eroded by sputtering. This procedure provides a measurement of the relative phosphorous concentration as a function of depth into the nickel layer. It is apparent from FIG. 3 that the pretreatment process of the present invention has significantly reduced the phosphorus concentration in the surface region of the plated nickel layer. The nickel layer was approximately 90 micro-inches (2.25 microns) thick overall.

The pretreatment process of the present invention comprises heating the nickel surface in an oxidizing atmosphere to a temperature of at least 347° C., preferably in the range 400°-600° C. and typically 500° C., for a time period of 2-15 minutes. Dry air is a suitable oxidizing atmosphere. The oxidation cycle is then followed by heating the nickel surface in a reducing atmosphere, preferably dry hydrogen, to a temperature above 300° C., preferably in the range 300°-500° C. and typically 400° C., for a time of the order of 2-15 minutes. The nickel surface can be returned to room temperature, stored and/or handled and transported between the oxidation and reduction steps.

Following the oxidation-reduction process, a solder preform is placed against the nickel surface, a semiconductor die placed on top of the solder preform, and the assembled pieces heated in a protective or reducing atmosphere to melt the solder in contact with the nickel surface and the die. Dry hydrogen is a suitable atmosphere. The unit is then cooled to room temperature.

The oxidation treatment is believed to convert the phosphorus in the surface region of the nickel layer to phosphorus oxides. These oxides (whether $P_2O_3$, $P_2O_4$, or $P_2O_5$, etc) sublime or boil away from the surface at comparatively low temperatures. The phosphorus oxide $P_2O_3$ vaporizes at 173° C., $P_2O_4$ sublimes at 180° C., and $P_2O_5$ sublimes at 347° C. These oxides form even at room temperature.

Any solder which has a liquidus temperature near the volatilization temperatures of these oxides and which is melted in contact with a phosphorus containing nickel surface will likely trap gas bubbles formed by the volatilization of the phosphorus oxides. Thus, it is essential that the oxidation step include raising the temperature of the header above 347° C. for a time sufficient to form and volatilize the highest temperature oxide, e.g., $P_2O_5$, formed by oxidation of the phosphorus within the surface region of the nickel coating. It is important that this volatilization take place prior to the melting of the solder in contact with the nickel surface. If, as in the prior art, the solder is melted in contact with the nickel surface before the phosphorus oxides other volatiles can sublime or evaporate, then the vaporization of these materials will likely produce gas bubbles or voids in the solder material. Voids are found when 95% lead, 5% tin solder is used for the attachment of silicon semiconductor die to electroless nickel plated copper headers. This solder has a melting temperature of 315° C. and is thus liquid at the temperatures at which volatilization of phosphorus oxides occurs. Thus, it is essential that the oxidation heating step occur in part at a temperature above 347° C. so as to volatilize all the phosphorus oxides formed in the surface regions of the nickel layer prior to bringing the solder material in contact with the nickel surface.

The oxidation step which is used to convert phosphorus to volatile phosphorus oxide also produces oxidation of the nickel surface. The nickel oxides must be removed prior to soldering in order to insure good wetting of the nickel surface by the solder material. This is conveniently accomplished by heating the nickel surface a second time, but in a reducing atmosphere. Heating to temperatures in the range 300°-500° C., typically 400° C., for 2-15 minutes in dry hydrogen is convenient and produces satisfactory results, however other methods of removing nickel oxides are also suitable. Substantially higher temperatures and longer times are undesirable in that they promote the diffusion of a fresh supply of phosphorus from the interior of the nickel layer to the surface. It is desirable but not essential to carry out the reducing step just prior to the soldering operation so as to minimize the amount of nickel oxide and other oxides which form on exposure to air even at room temperature.

It has been found that when copper headers covered with an electroless nickel layer are subjected to the oxidation-reduction cycle described above prior to solder attachment of a semiconductor die, that the number of voids present in the solder layer between the die and the header is substantially reduced. This increases the manufacturing yield, significantly reduces the cost of the finished devices, and improves device performance.

The shift in forward voltage drop $\Delta V_f$ of a PN junction diode in response to a steady forward current is a measure of the junction temperature rise during operation and is a known means for determining how well the diode is thermally coupled to the header. Fewer voids means better thermal coupling and smaller values of $\Delta V_f$. Headers and die soldered with 95% Pb - 5% Sn solder using conventional prior art techniques had a mean value of $\Delta V_f$ of 0.53 volts and a variance of 0.0041 volts, while otherwise identical headers and die soldered with the same material but using the pretreatment process of the present invention had a mean $\Delta V_f$ value of 0.46 volts and variance of 0.0032 volts. This is a significant improvement in the mean and variance of $\Delta V_f$. These results indicate that the wetting of the solder has been much improved and the number of voids reduced.

The oxidation-reduction cycle described above also serves to remove from the surface of the nickel any readily oxidizable sulfides or organic materials which are volatile at the temperatures of interest for soldering. Thus, the nickel surface following the oxidation-reduction treatment is particularly clean and the solder wetting angles are improved to approximate those found with pure nickel surfaces.

While the invention has been described in terms of particular examples of semiconductor devices being soldered to electroless coated copper headers, those of skill in the art will understand that the principles described herein apply to other forms of devices and other arrangements in which nickel surfaces containing phosphorus, sulfur, organics, or other oxidizable volatile contaminants are to be joined to solders at temperatures comparable to the volatilization temperatures of the phosphorus oxides, sulfides, organics, or other contaminants. It is intended to cover these and other variations in the claims which follow.

I claim:

1. A process for improving the solderability of objects coated with a nickel and phosphorus mixture, comprising:
   providing an object having thereon a nickel coating which contains phosphorus;
   heating said coated object in an oxidizing atmosphere to a temperature of at least 347° C. for a time exceeding two minutes; and
   thereafter heating said coated object in a reducing atmosphere to a temperature of at least 300 degrees C.

2. A process for improving the solderability of objects coated with an electroless nickel plating, comprising:
   providing an object having thereon a nickel plating formed in an electroless phosphorus bearing solution;
   heating said nickel plated object in an oxidizing atmosphere to a temperature of at least 347° C.; and
   thereafter heating said nickel plated objects in a reducing atmosphere to a temperature of at least 300° C.

3. A process for attaching semiconductor die to metal headers, comprising:
   providing a metal header adapted to receive semiconductor die;
   plating said header with nickel in a solution containing phosphorus;
   heating said plated header in an oxidizing atmosphere to a temperature of at least 347° C.;
   heating said plated header in a reducing atmosphere;
   providing a solder material in intimate contact with said semiconductor die and said plated header; and
   heating said solder, said semiconductor die, and said plated header to melt said solder in contact with said semiconductor die and said plated header.

4. A process for reducing void formation in solder joints to phosphorus containing nickel layers, comprising:
   providing a nickel layer containing phosphorus;
   heating said nickel layer in an oxidizing atmosphere to a temperature of at least 347° C.;
   heating said nickel layer in a reducing atmosphere;
   placing a solder in intimate contact with said nickel layer; and
   heating said solder and said nickel layer to form said joint.

5. The process of claim 4 wherein said step of heating said nickel layer in an oxidizing atmosphere comprises heating for at least two minutes.

6. The process of claim 5 wherein said step of heating said nickel layer in an oxidizing atmosphere comprises heating to a temperature of about 400° C. or more.

7. The process of claim 6 further wherein said step of heating in an oxidizing atmosphere comprises heating to a temperature of not more than 600° C.

8. The process of claim 4 wherein said step of heating said nickel layer in a reducing atmosphere is carried out before said placing step.

9. The process of claim 8 wherein said step of heating said nickel layer in a reducing atmosphere comprises heating to a temperature of at least 300° C. for a time of at least two minutes.

10. The process of claim 8 wherein said step of heating said nickel layer in a reducing atmosphere comprises heating to a temperature of at least 347° C.

* * * * *